United States Patent [19]

Bishop

[11] Patent Number: 5,019,312
[45] Date of Patent: May 28, 1991

[54] METHOD FOR ASSEMBLING A BICYCLE FRAME

[75] Inventor: Stephen J. Bishop, West Carrollton, Ohio

[73] Assignee: Huffy Corporation, Miamisburg, Ohio

[21] Appl. No.: 588,503

[22] Filed: Sep. 27, 1990

Related U.S. Application Data

[63] Continuation of Application Ser. No. 437,860 filed Nov. 17, 1989 abandoned, which is a division of Ser. No. 259,383, now U.S. Patent No. 4,900,050 issued on Feb. 13, 1990.

[51] Int. Cl.⁵ .............................................. B29C 43/18
[52] U.S. Cl. ................... 264/152; 264/258; 280/281.1
[58] Field of Search ............... 264/257, 258, 137, 108, 264/152; 280/281.1

[56] References Cited

U.S. PATENT DOCUMENTS

| | | | |
|---|---|---|---|
| 3,935,355 | 1/1976 | Kuhn | 24/1 |
| 4,106,797 | 8/1978 | Michael | 285/156 |
| 4,145,068 | 3/1979 | Toyomasu et al. | 280/281.1 |
| 4,200,480 | 4/1980 | Wolinski et al. | 156/294 |
| 4,405,543 | 9/1983 | Murphy | 264/109 |
| 4,437,288 | 3/1984 | Foissac et al. | 52/637 |
| 4,479,662 | 10/1984 | Defour | 280/281.1 |
| 4,493,749 | 1/1985 | Brezina | 156/187 |
| 4,504,086 | 3/1985 | Carrow | 285/156 |
| 4,541,649 | 9/1985 | Grünfeld | 280/281.1 |
| 4,556,590 | 12/1985 | Bannink, Jr. | 428/43 |
| 4,650,620 | 3/1987 | Owen | 264/257 |
| 4,657,795 | 5/1987 | Foret | 428/36 |
| 4,828,285 | 5/1989 | Foret | 280/279 |
| 4,828,781 | 5/1989 | Duplessis | 264/257 |
| 4,850,607 | 7/1989 | Trimble | 280/281.1 |
| 4,856,800 | 8/1989 | Hashimoto | 280/281.1 |

FOREIGN PATENT DOCUMENTS

164658 1/1954 Australia .
2600031 12/1987 France .
108169 9/1978 Japan .

*Primary Examiner*—Jay H. Woo
*Assistant Examiner*—Jeremiah F. Durkin, II
*Attorney, Agent, or Firm*—Biebel & French

[57] ABSTRACT

In a bicvycle frame wherein a plurality of frame members are selectively joined together at the ends thereof, each of the joints which support the head tube, the seat and the crank housing is a lug joint consisting of a plurality of organic fiber layers partially wrapping the joined end portions of the frame members, the fibers composing each layer being oriented at different angles from the fibers in the adjacent layers, and all of these sheets being impregnated with resin which hardens to secure the sheets to the frame members. Web portions of these fiber layers also enclose a portion of the space between wrapped portions of the frame members, and each of these spaces is filled with a suspension of microballoons in hardened resin which cooperates with the web portions of the fiber layers to brace the joined frame members against movement toward each other during use of the bicycle. The production of bicycle frames in accordance with the invention is expedited by utilizing, as the resin component of each joint, a two-part resin which sets by exothermic reaction at room temperature and thus eliminates need for heat treatments such as are required in the case of thermosetting resins, brazing and other such manufacturing procedures.

8 Claims, 3 Drawing Sheets

METHOD FOR ASSEMBLING A BICYCLE FRAME

REFERENCE TO RELATED APPLICATIONS

This is a continuation of application Ser. No. 437,860, filed Nov. 17, 1990, now abandoned, which is a division of Ser. No. 259,383, now U.S. Pat. No. 4,900,050, issued on Feb. 13, 1990.

BACKGROUND OF THE INVENTION

This invention relates to bicycle frames, and more particularly to the manufacture of bicycle frames from tubular frame components made from non-metallic materials.

The advantages of using high strength to weight composite materials, such as fiber-reinforced resin materials, as the major components of bicycle frames are well known in the industry, particularly for the purpose of reducing the overall weight of the frame. One such material made in tubular form from layers of fabric sheets impregnated with resin which has been found suitable in the manufacture of bicycle frames is disclosed in Foret U.S. Pat. No. 4,657,795 of 1987.

It has also been proposed in the bicycle industry to produce frames wherein tubular frame components are secured together by means of lugs formed of a different material. For example, Toyomasu U.S. Pat. No. 4,145,068 of 1969 discloses a bicycle frame comprising steel tubes which are connected together at their ends by lugs that are diecast of aluminum bronze around the tube ends, to be connected. Similarly, Grunfeld U.S. Pat. No. 4,541,649 of 1985 shows a frame construction wherein steel, aluminum or plastic tubular components are secured together by plastic lugs which are injection molded around the tube ends to be connected.

Such prior art structural expedients, however, have proved to be unacceptable in the manufacture of bicycle frames from fiber reinforced resin tube components, hereinafter referred to generally as "composite" materials. Not only do they produce high bonding stresses which result weak joints, but these joints may further weaken and break due to differences in the rates of thermal expansion and contraction between the tube members and the lugs. In addition, many joints formed by the bonding of dissimilar materials tend to deteriorate as the result of galvanic corrosion.

SUMMARY OF THE INVENTION

The present invention provides a bicycle frame comprising a plurality of tubular components of composite material which have their end portions interconnected by lugs of novel composition and manner of fabrication and use. More specifically, each of these lug connections comprises a plurality of fiber-reinforced sheets which surround the abutting ends of the tubular frame components and are impregnated with resin that then sets to bond them together and to the tubular components.

Additional strength can be contributed to each of these lug connections without significantly affecting their lightweight properties by filling any spaces between the reinforced sheets and the tubular members with rigid foam produced in place by a mixture of microballoons and the same resin employed in the remainder of the connection, which preferably is a two-part resin that sets by exothermic action at room temperature, as further described hereinafter.

Lug connections in accordance with the invention are produced by assembling all of the components in a two-part mold which also receives and properly positions the end portions of the tubular frame components to be joined. The resin component of each joint may be added to each fabric layer before it is set in place, or the resin may be injected into the mold after the other components of the joint have been set in place in dry form. After the resin has set, the mold parts are separated, and any flash projecting from the joint is readily cut away, followed by finish sanding before the frame is painted.

These and other objects and advantages of the invention, and the means and method steps by which they are achieved, will in part be apparent from and in part be pointed out in the course of the description of the preferred embodiment of the invention which follows.

DESCRIPTION OF THE PREFERRED EMBODIMENT

Figure 1:
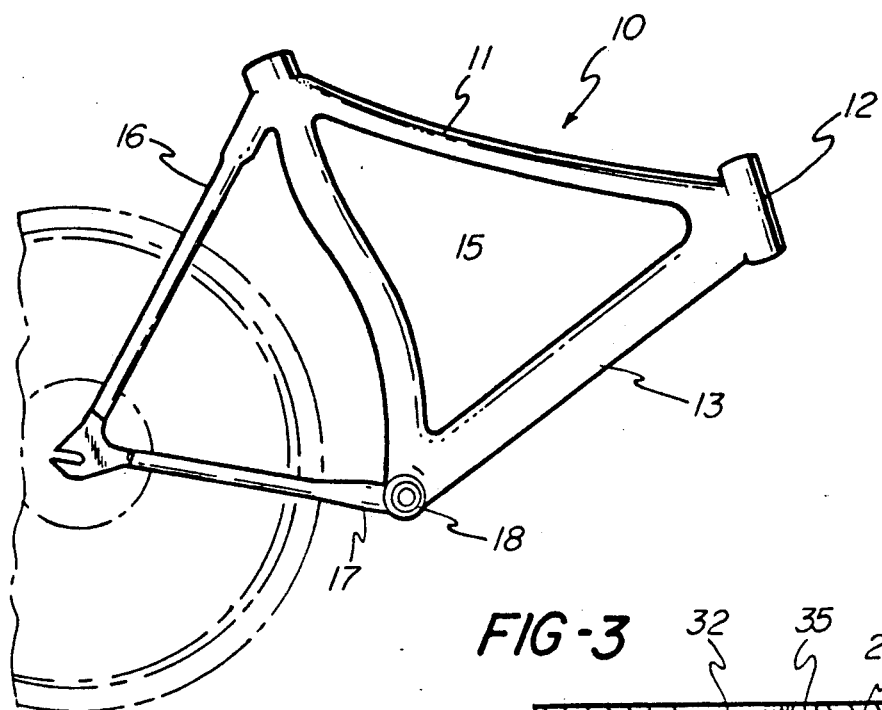
FIG. 1 is a somewhat diagrammatic view in side elevation illustrating a bicycle frame produced in accordance with the invention.

The bicycle frame 10 shown in FIG. 1 is especially designed for racing purposes, and one purpose of the invention is to reduce the weight of this frame as much as possible. For simplicity, details not necessary for understanding the invention have been omitted, but it is to be understood that insofar as possible, the frame 10 is composed of tubular members made from fiber-reinforced composite materials which are conventional for that purpose in the frames of lightweight bicycles. More specifically, the top tube 11, head tube 12, down tube 13 and seat tube 15 are preferably of composite material, but the seat stay 16 and chain stays 17 may be of aluminum in order to achieve adequate rigidity and small cross section, and the crank housing 18 may also be of metal or provided with a metal liner sleeve. The frame includes three junction points —at each end of the seat tube 15 and at the head tube 12—where these frame members converge in such angular relation that the end portions of each pair of adjacent joined fame members which are adjacent their joined ends define a wedge shaped space therebetween, a typical example being shown in FIG. 4 where there is a wedge shaped space between the seat tube 15 and the top tube 11 and another such space between the seat tube 15 and the seat stay 16. The invention provides lug joints at all three of these junction points which fill the apex ends of these wedge shaped spaces, and as shown in FIG. 2, all of these lug joints are produced simultaneously in a two-part mold.

Figure 3:
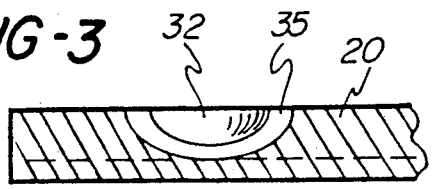
FIG. 3 is an enlarged fragmentary section on the line 3—3 of FIG. 2.
Figure 2:
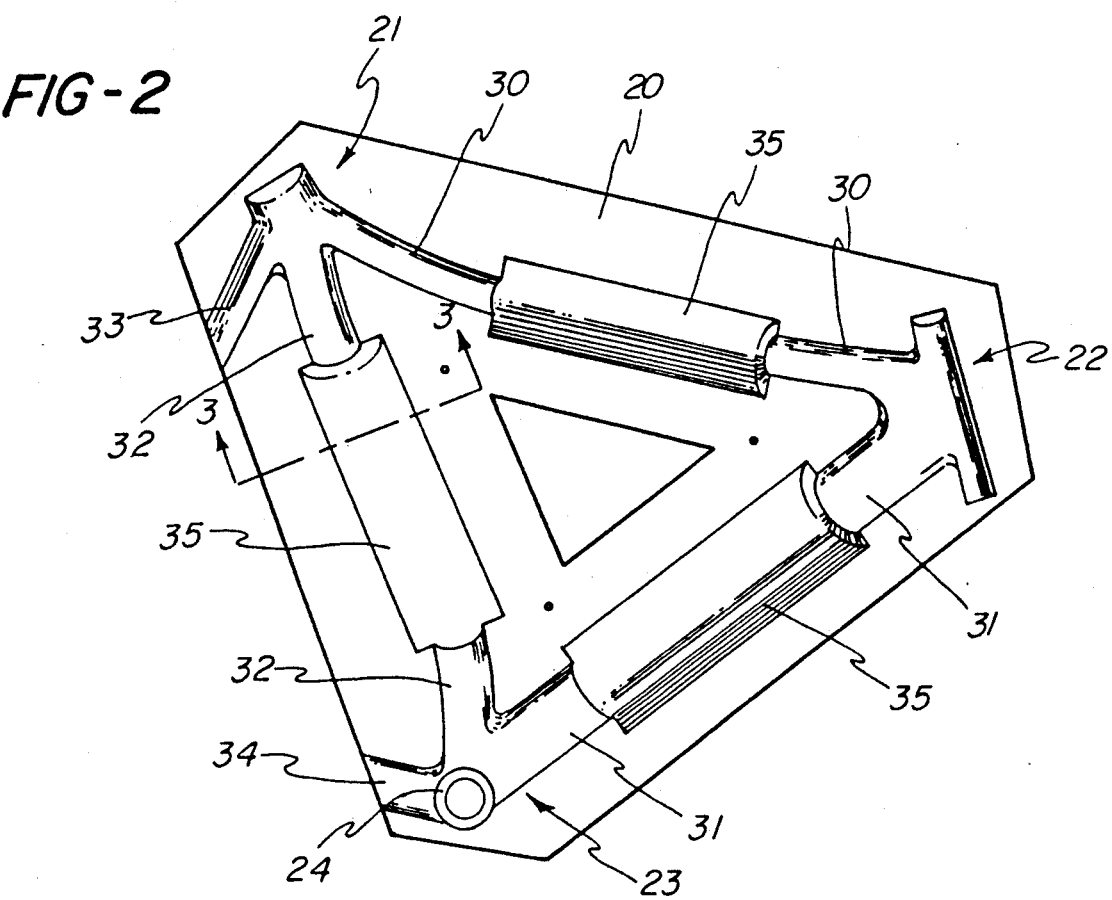
FIG. 2 is an isometric view showing the drag section of a two-part mold in which the frame shown in FIG. 1 was produced.

The cavities in one mold part will normally represent complementary mirror images of those in the other part, and FIGS. 2 and 3 therefore show only the drag section 20 of the mold. It includes separate cavities 21, 22 and 23 wherein separate lug joints are created around end portions of the various frame components. More specifically, the top tube 11, seat tube 15 and rear stay 16 are joined in the cavity 21, and the top tube 11, head tube 12 and down tube 13 are joined in the cavity 22. The down tube 13, seat tube 15 and chain stays 17 are joined in the cavity 23, which also includes a portion 24 for holding the crank housing 18.

The mold part 20 also includes cavities which receive and accurately position the various frame components with respect to the cavities 21-23. Thus the top tube 11 is received and positioned by cavities 30, and the down tube 13 is similarly received and positioned in cavities 31. The seat tube 15 is received and positioned by cavities 32, and the seat stay 16 and the forward ends of the chain stays 17 are received and positioned by cavities 33 and 34. The cavities 35 are non-functional except to provide space for freely accommodating the middle portions of the top tube 11, down tube 13 and seat tube 15 so that various configurations of these portions of these tubes can be accommodated in the same set of molds.

Figure 4:
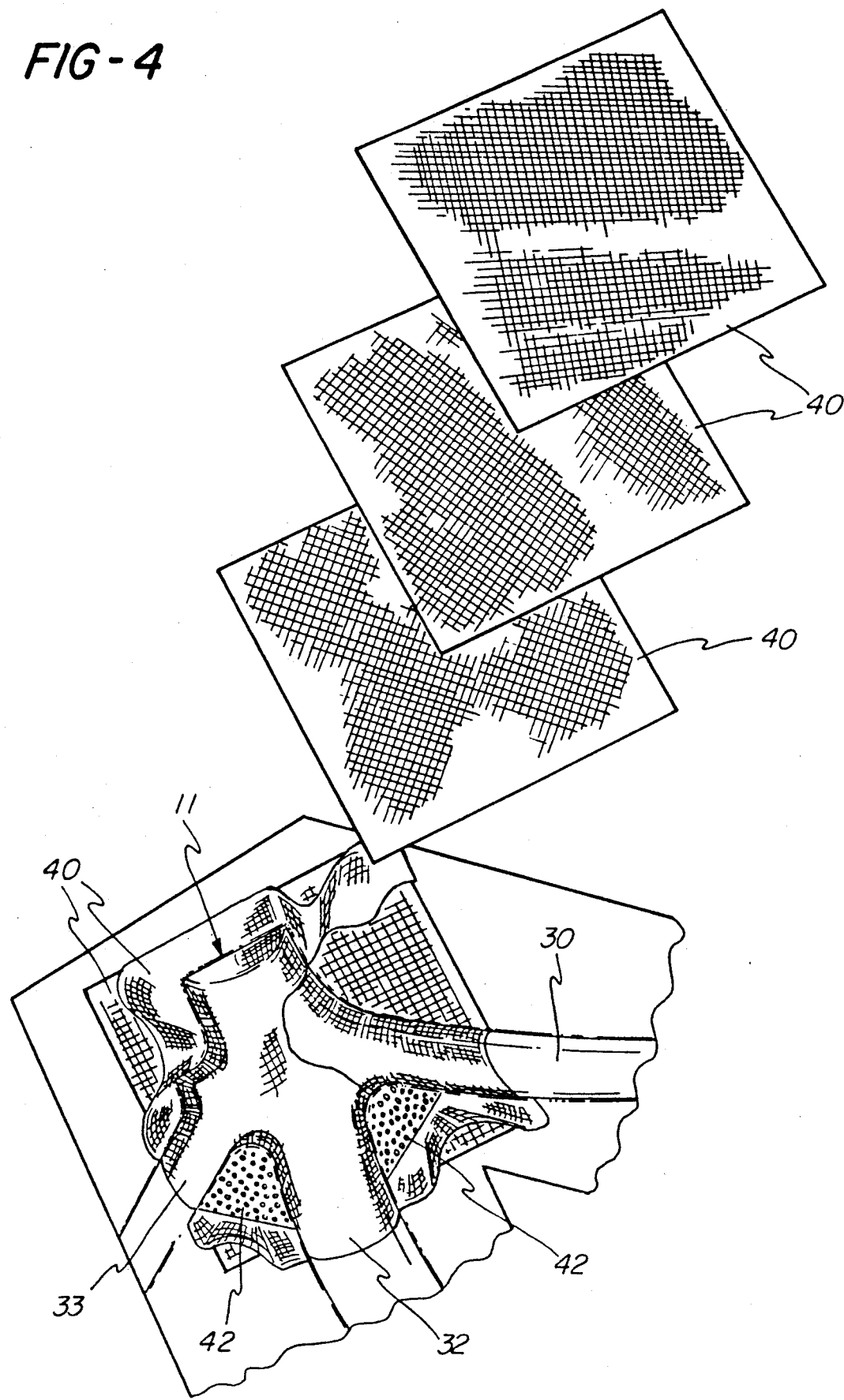
FIG. 4 is a plan view illustrating an intermediate stage in the assembly of the components of the connection between the top tube, the seat tube and the seat stay in the bicycle frame shown in FIG. 1.
Figure 5:
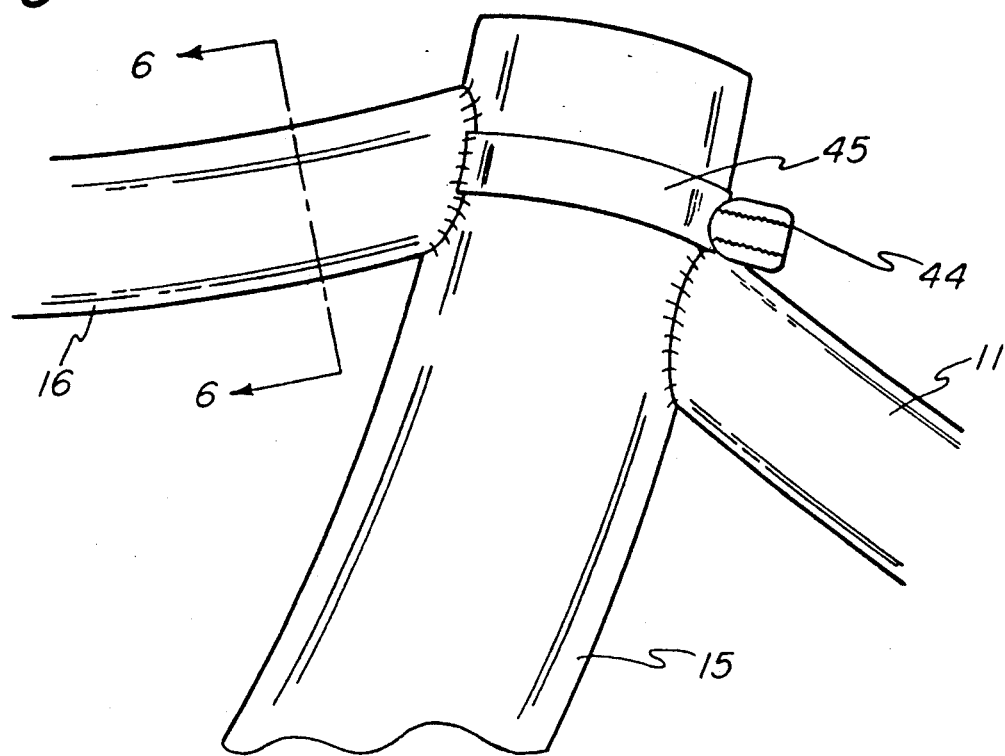
FIG. 5 is a fragmentary elevational view showing the frame components to be connected as shown in FIG. 4 prior to their insertion in the mold.
Figure 6:
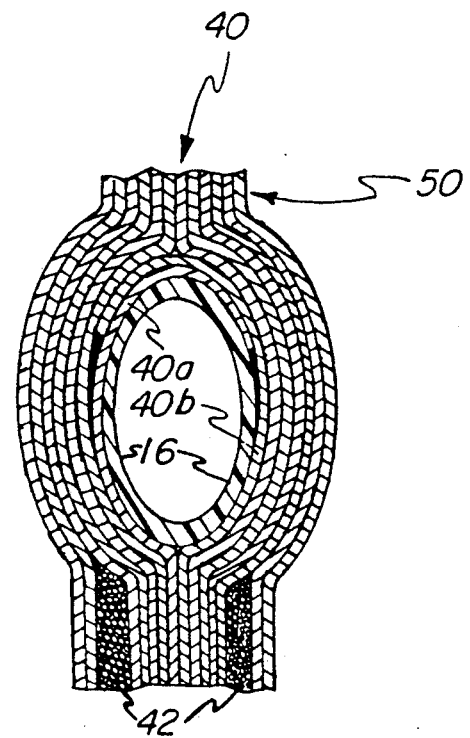
FIG. 6 is an enlarged and somewhat diagrammatic view taken as indicated by the line 6—6 in FIG. 5 but illustrating another intermediate stage in making the connection between the components shown in FIG. 5.

The steps employed in the fabrication of one lug joint in accordance with the invention are illustrated in FIGS. 4-6, namely the junction of tubes at the top of the seat tube 15. The first step is to coat the cavity 21 with a conventional gel coat, after which two successive layers 40 of composite fabric saturated with resin adhesive are laid over the gel coat. Preferred results have been obtained using as the adhesive a two-part epoxy of the type which sets with an exothermic action at room temperature, e.g. the resins sold under the designations "87" and "88" by FiberGlast Developments Corp., Dayton, Ohio.

Preferred results in the practice of the invention have been obtained with each of the layers 40 being a woven fabric of graphite fibers, particularly if the primary directions of orientation of the fibers in each successive sheet—the warp and weft—are rotated through an angle, e.g. 30°, with respect to the preceding sheet so that in the finished joint, there will be fibers extending in many directions for properly resisting stresses to which the joint is subjected in use. If the layers 40 are of nonwoven graphite fiber fabric, or are otherwise fiber-reinforced, the directions of orientation of the fibers in successive layers should be similarly varied.

After the first two fabric layers have been set in place and hand smoothed into cavity 21 and the associated tube-receiving cavities, the apex portions of the wedge shaped spaces between the converging cavities 30, 32 and 33 are partially filled with a putty-like mixture 42 of microballoons and adhesive, preferably the same adhesive as used to saturate the fabric layers 40. The mixture 42 is hand formed to cover the web portions of the layers 40 which extend between the cavities 30, 32 and 33 to a depth approaching one-half of the corresponding dimension of the converging end portions of the top tube 11, seat tube 15 and seat stay 16. This stage of the method of the invention is illustrated in FIG. 4, and thereafter additional, preferably four, fabric layers 40 which have been saturated with adhesive are superimposed, one by one, on the previous layers 40 and mix 42, with each successive layer having the fibers therein at different angles with respect to the preceding layer, as noted above.

Cavities 22 and 23 in the mold part 20 are prepared by similarly building up layers of fabric along with a quantity of the mixture 42. In each case, the mixture 42 is positioned between cavities which will receive the converging end portions of frame members, i.e. the space between the cavities 30 and 31 at the cavity 22, and in the spaces between the cavity 32 and each of the cavities 31 and 34 at the cavity 23.

Prior to placing any of the frame members in the mold, they are assembled separately from the mold and preliminarily secured together by means of a strong and fast-setting adhesive, such for example as the adhesive sold as EC 3561 by 3M Company. Before the frame members are assembled, the ends of certain of them are miter cut for close fitting assembly purposes. Thus as shown in FIG. 5, the ends of the top tube 11 and seat stay 16 are provided with rounded miter cuts configured for the proper close fitting engagement with opposite sides of the seat tube 15. The assembly and preliminary adhesion of the frame members is readily carried out in the mold parts, since the cavities 30-35 are designed to hold the members in proper relation with each other.

The joint shown in FIG. 5 also includes a block 44 of aluminum which is internally drilled and threaded to receive the set screw for holding the seat post in vertically adjusted position in the finished bicycle. This block 44 has secured thereto a looped strap 45 of aluminum which fits over the upper end of the seat stay to support the force of the set screw on the seat post in the finished bicycle. As shown in FIG. 5, the miter cut ends of the top tube 11 and seat stay 16 are configured to fit with these parts as well as with the seat tube, and all these parts are initially secured together by adhesive.

After all of the frame members have thus been provisionally interconnected, a single layer of fabric impregnated with resin is laid over each of these joints from each side thereof and is wrapped around the joined parts as as possible. More specifically, and as shown in FIG. 6, the first of these layers 40(a) is wrapped around the surface of the seat stay which is remote from the seat tube so that it extends well beyond the central vertical plane of the frame, e.g. by at least 30°-40°. The layer 40(b) which is then applied from the other side is similarly wrapped around the stay so that it is in overlapping relation over approximately 90° with the corresponding portion of the first layer. The same procedure is followed as much as possible around the abutting end portions of the top tube 11 and seat tube 15.

Each of the other two joints in the frame is similarly treated with a pair of fabric sheets which overlap each other across the outside of each of the joined frame members, i.e., around the converging end portions of the top tube 11 and down tube 13, and similarly around the outside of the adjacent end portions of the down tube 13 and chain stays 17. In the finished joint, these overlapping layers of fabric reinforce the joint against any force tending to cause the wrapped frame members to be spread away from each other.

The preliminarily assembled frame is then set in the mold, with the joined tube end portions being pressed manually into their respective prepared cavities so that the filler mixture 42 is displaced to whatever extent is necessary for a smooth and firm fit of the tube end portions into each mold cavity. The top or cope half of the mold, which has already been similarly prepared with superimposed fabric layers 40 and filler mixture 42, is then set in place, and the two mold halves are firmly bolted or otherwise forced and secured together. During this step, the layers 40 which face each other adjacent the central plane of the frame 10 will be forced into firm contact with each other so that they will become permanently resin-bonded to each other, as well as to the successive other layers 40 on each side of the finished joint.

After the two-part resin reacts and sets, the mold halves are separated, and the assembled frame is removed and left alone for about 24 hours. At this stage, which is illustrated in FIG. 6, each joint will include substantial portions of flash, as shown at 50 in FIG. 6, composed of the outer portions of the fabric layers 40 which were initially laid flat in each mold part and are bonded together so that they project radially outward from the middle of each joint. Thereafter, each joint is finished by cutting this flash away and sanding smoothly the entire surface of the joint in preparation for finish painting.

In the finished frame produced in accordance with the invention, each of the lug joints is characterized by lightness in combination with a high degree of strength which will resist all of the stresses to which it is likely to be subjected in use. More specifically, with each joint comprising multiple layers of fiber reinforcement running in many directions around the joint, and with these fabric layers secured to the seat tube 15 and to both the top tube 11 and the seat stay 16, maximum resistance is provided against spreading of any adjacent pair of frame members incorporated in the joint. At the same time, the mixture of microballoons in resin which is positioned between the converging ends of each adjacent pair of joined frame members forms what in effect is a strong and rigid foam which provides strong reinforcement against stresses tending to cause any joined pair of members to move toward each other.

These advantages of the invention are especially outstanding when the frame members themselves are formed of resin and fiber composite materials, both because of the intimacy of the bonding of all parts in each joint, and also because of the overall lightweight characteristics provided to the frame. However, the same technology is applicable to frames wherein some or all of the frame members are of other materials, including metal and plastic.

While the foregoing description is directed to the use of a two-part mold wherein all of the three lug joints are formed at the same time, it should be apparent that three separate sets of two-piece molds could be used with each set configured to form one of the three joints. Also, the invention can be practiced by injection molding, with the joint parts assembled as described utilizing dry graphite fabric layers. Then after the assembly has been placed in the mold, a suitable resin in fluid form which will saturate the fabric layers is injected into the mold, using conventional injection molding technique, and then caused to set to hardness as in the method already described.

While the product herein described and the methods for carrying this product into effect, constitute preferred embodiments of this invention, it is to be understood that the invention is not limited to this precise product and these methods, and that changes may be made therein without departing from the scope of the invention which is defined in the appended claims.

What is claimed is:

1. In the manufactured of a bicycle frame comprising a plurality of preformed rigid permanent frame members having end portions thereof in converging abutted relation, the method of forming a lug joint incorporating said abutting end portions of said frame members, comprising the steps of:
   (a) assembling said permanent frame members in predetermined relation wherein converging end portions thereof abut to define three joints,
   (b) preliminarily securing said abutting end portions of said frame members together in said joint defining relation,
   (c) encasing each of said joints in multiple layers of oriented organic fibers which are impregnated with liquid resin and which are sized to wrap only end portions of said frame members and to form web portions extending across the space between the wrapped portions of said frame members while leaving exposed the portions of said frame members between said wrapped portions, and
   (d) causing said resin to set while holding said layers in compressed relation around said joints and thereby causing said fiber layers to adhere together and to secure said joined frame members permanently together.

2. The method defined in claim 1 wherein said encasing step is carried out separately for each of said fiber layers, and wherein the direction of orientation of the fibers in each successive said layer is at an oblique angle with respect to the preceding said layer.

3. The method defined in claim 1 wherein said preliminarily securing step includes the application of a strong and fast-setting adhesive to said abutted permanent frame members.

4. The method defined in claim 1 wherein prior to said assembling step, the end of said permanent frame members are miter cut for close fitting assembly purposes.

5. The method defined in claim 2 wherein said encasing operation comprises initially applying to one side of each of said joints a single said impregnated fiber layer sized to wrap and adhere directly to the surface of each of said abutting permanent frame members, and applying to the other side of each of said joints a second impregnated fiber layer sized to overlap portions of said first layer wrapping said frame members.

6. The method defined in claim 1 further comprising the step of filling any space between adjacent said web portions of said fiber layers with a suspension of microballoons in the same said liquid resin prior to causing said resin to set.

7. The method defined in claim 1 further comprising the steps of providing spaces between certain of the innermost said web portions of said fiber layers and the remainder of said web portions on each side of said joint, and filling each said space with a suspension of microballoons in the same said liquid resin prior to causing said resin to set.

8. The method defined in claim 1 wherein said resin is a two-part resin which sets by exothermic reaction at room temperature.

* * * * *

UNITED STATES PATENT AND TRADEMARK OFFICE
CERTIFICATE OF CORRECTION

PATENT NO. : 5,019,312

DATED : May 28, 1991

INVENTOR(S) : Stephen J. Bishop and Michael D. Melton

It is certified that error appears in the above-identified patent and that said Letters Patent is hereby corrected as shown below:

Title page:

"Michael D. Melton" has been omitted as an inventor.

In the "References Cited": Bannink, Jr. -

"4,556,590" should be --4,556,592--.

Column 6, line 4, "manufactured" should be --manufacture--.

Signed and Sealed this

Tenth Day of November, 1992

*Attest:*

DOUGLAS B. COMER

*Attesting Officer*  *Acting Commissioner of Patents and Trademarks*